March 22, 1932. O. F. ROHWEDDER 1,850,604
FEEDING APPLIANCE FOR BREAD SLICING MACHINES
Filed Feb. 27, 1930 5 Sheets-Sheet 1
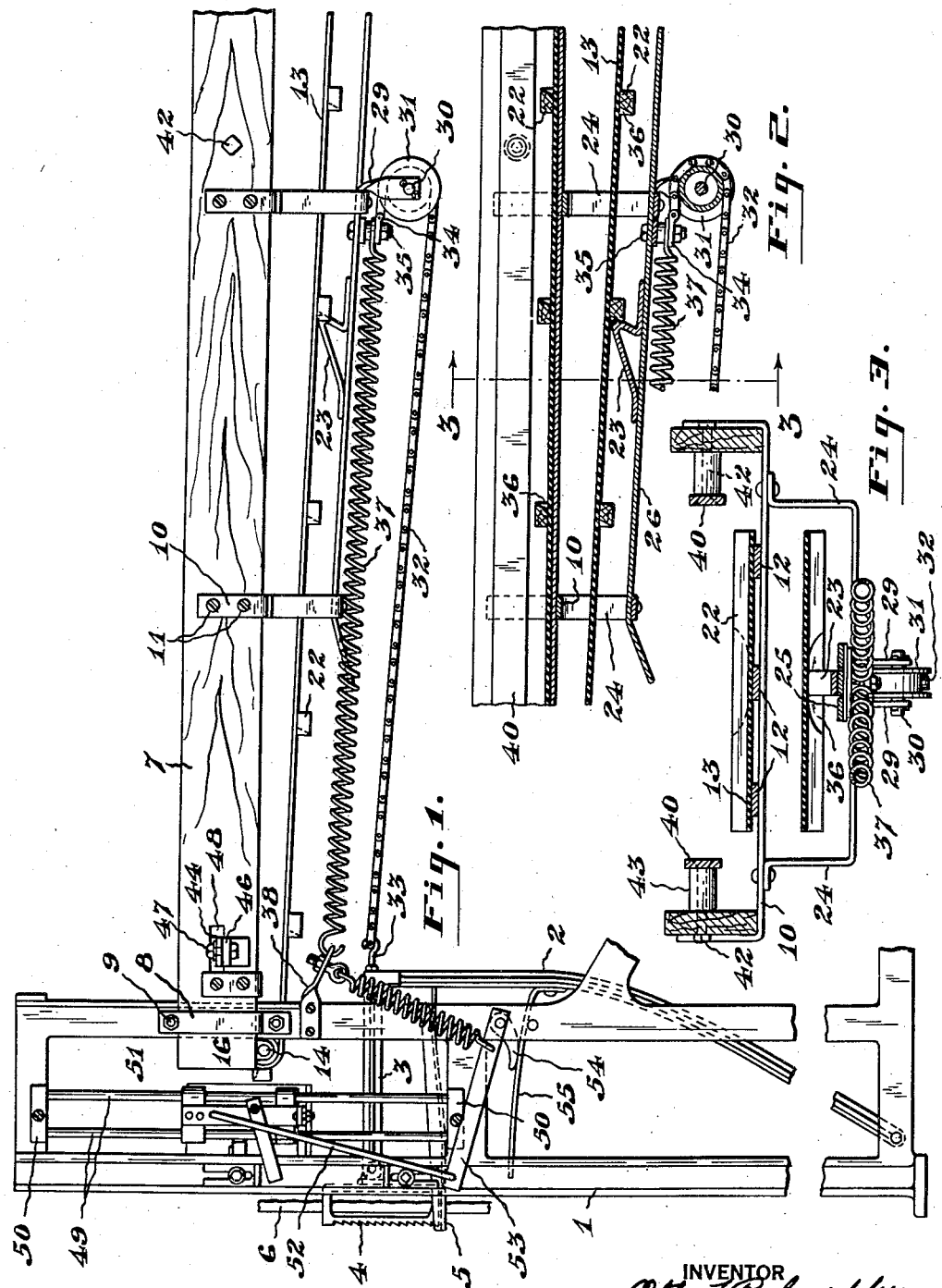
INVENTOR
Otto F. Rohwedder
BY
Evans + McCoy
ATTORNEYS

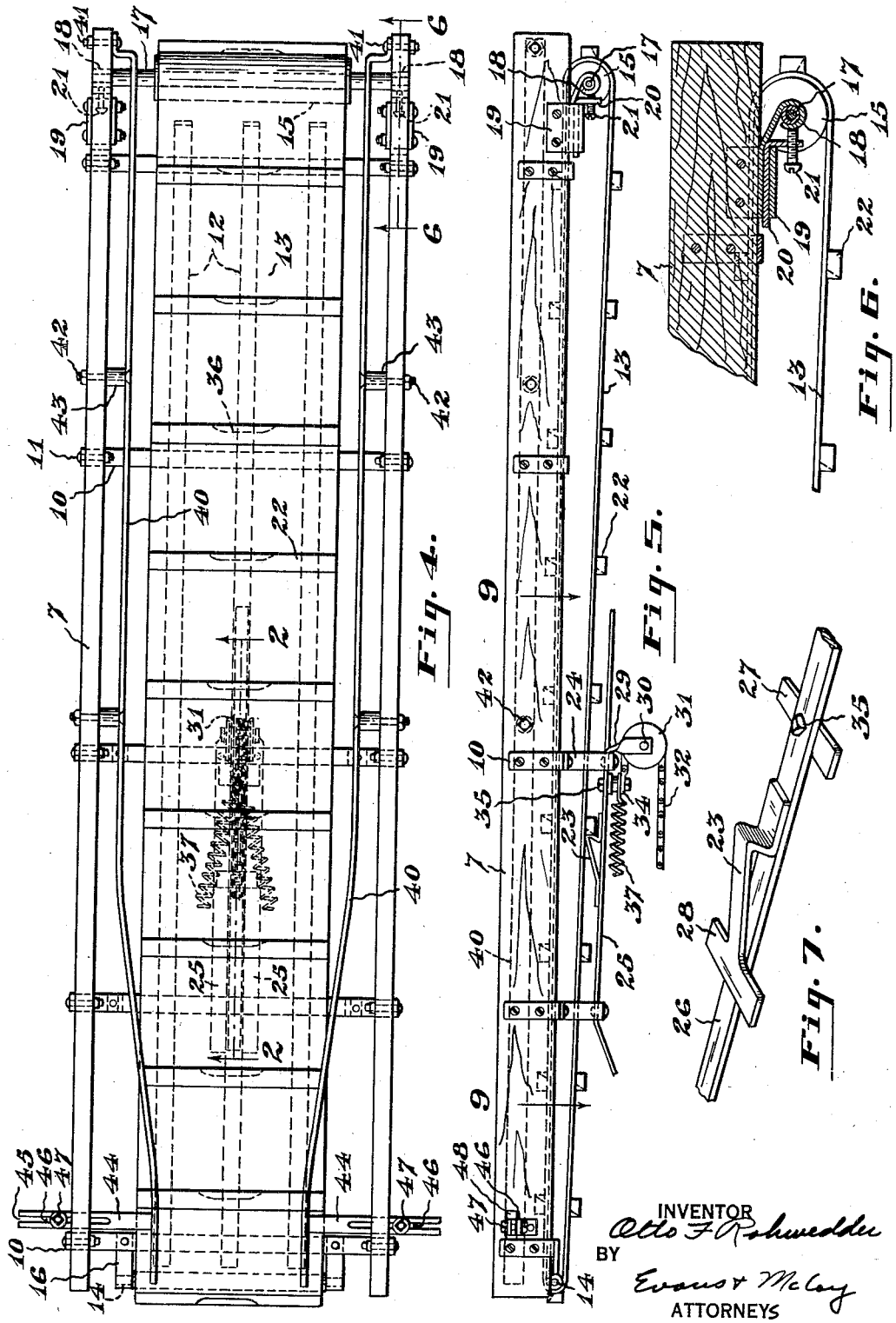

March 22, 1932.  O. F. ROHWEDDER  1,850,604
FEEDING APPLIANCE FOR BREAD SLICING MACHINES
Filed Feb. 27, 1930   5 Sheets-Sheet 3

INVENTOR
Otto F. Rohwedder
BY
Evans & McCoy
ATTORNEYS

March 22, 1932. O. F. ROHWEDDER 1,850,604
FEEDING APPLIANCE FOR BREAD SLICING MACHINES
Filed Feb. 27, 1930    5 Sheets-Sheet 4

INVENTOR
Otto F. Rohwedder
BY
Evans & McCoy
ATTORNEYS

Patented Mar. 22, 1932

1,850,604

UNITED STATES PATENT OFFICE

OTTO F. ROHWEDDER, OF DAVENPORT, IOWA, ASSIGNOR TO MAC-ROH SALES & MFG. COMPANY, OF BETTENDORF, IOWA, A CORPORATION OF DELAWARE

FEEDING APPLIANCE FOR BREAD SLICING MACHINES

Application filed February 27, 1930. Serial No. 431,823.

This invention relates to bread slicing machines, particularly to feeding mechanisms therefore, and is a continuation in part of my copending application Serial No. 347,838, filed March 18, 1929.

One of the objects of the present invention is to provide a bread slicing machine with new and improved means for feeding bread thereto.

Another object is to provide a bread slicing machine with simple and efficient means for conveying the bread to and depositing it on the table loading device in centered slicing position.

Another object is to provide a bread slicing machine with an improved intermittently operated conveyor mechanism for feeding bread to the machine.

With the above and other objects in view, the present invention may be said to comprise the apparatus as illustrated in the accompanying drawings to be hereinafter described and particularly set forth in the appended claims, together with such variations and modifications thereof as will be apparent to one skilled in the art to which this invention appertains.

In the accompanying drawings, which illustrate a suitable embodiment of the present invention, Figure 1 is a side elevation of the feeding apparatus applied to the bread cutting machine.

Fig. 2 is an enlarged longitudinal section taken on the line 2—2 of Fig. 4.

Fig. 3 is an enlarged transverse section taken on the line 3—3 of Fig. 2.

Fig. 4 is a full length plan view of the conveyor.

Fig. 5 is a side elevation of the conveyor and supporting frame, the drive chain and return spring being partially broken away.

Fig. 6 is an enlarged section taken on the line 6—6 of Fig. 4 showing the conveyor adjusting mechanism.

Fig. 7 is an enlarged perspective view of the conveyor drive bar.

The feeding mechanism of the present invention is particularly adapted to the type of bread slicing machine shown and described in my copending applications Serial Nos. 249,612 and 290,503 filed January 26, 1928, and July 5, 1928, respectively. It is to be understood, however, that the invention about to be described is equally adaptable to any other type of slicing machine, such as those embodying continuous cutting blades.

For clearness of illustration, the driving mechanism is omitted and the cutting blades are only partially shown.

Figure 8:
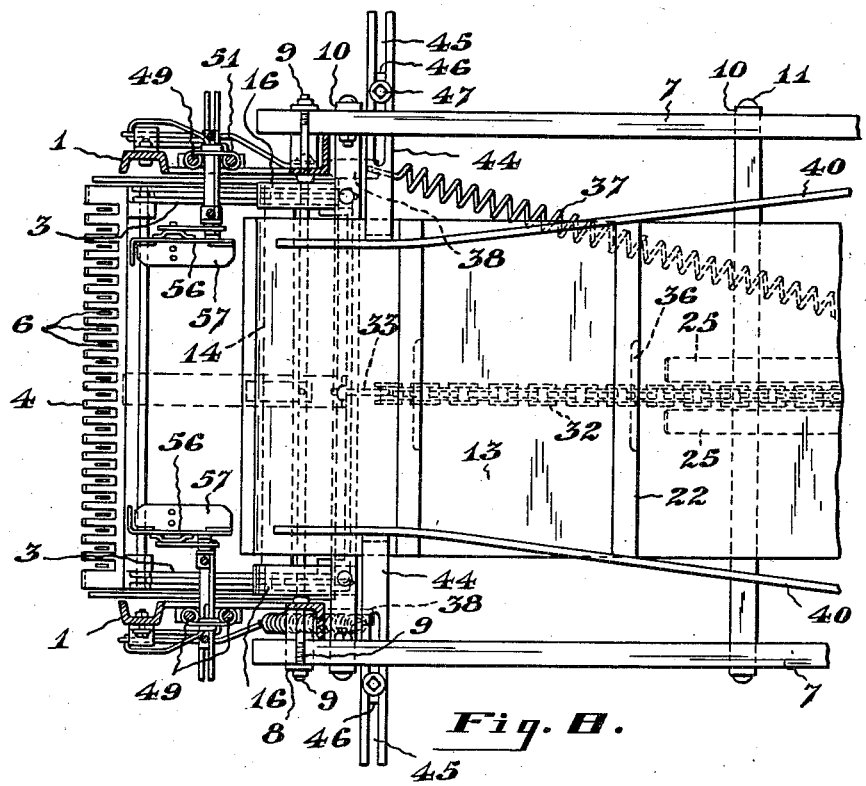
Fig. 8 is an enlarged plan view showing the forward end of the conveyor together with the feeding and slicing mechanism.
Figure 9:
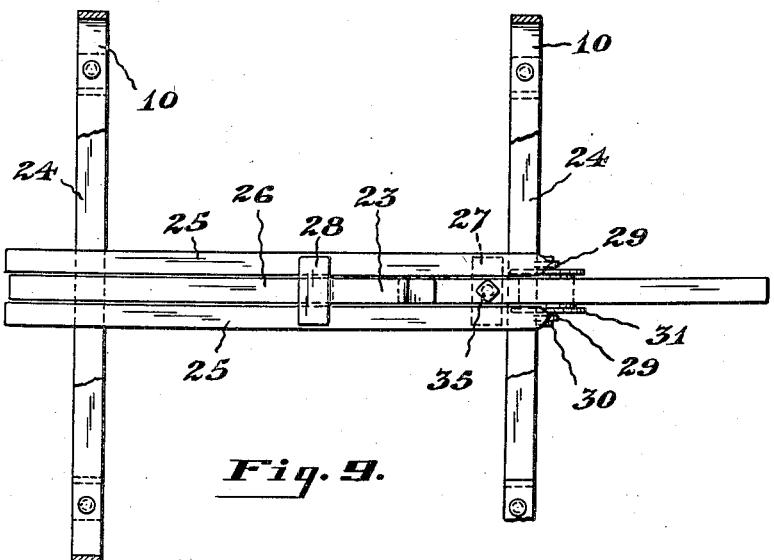
Fig. 9 is an enlarged section taken on the line 9—9 of Fig. 5.

Referring to the accompanying drawings, in which like numerals refer to like parts throughout the several views, the slicing machine generally comprises a pair of side frames 1 having a pair of pusher levers 2 pivoted thereto which are provided with a connecting cross bar at their upper ends, the upper ends thereof being formed with forwardly projecting extensions 3. As shown in Figs. 1 and 8, a pusher head 4 is pivoted to the forward ends of the extensions 3 and is adapted to be reciprocated forwardly and rearwardly over a feed table 5 which is pivoted to the side frames 1.

The bread to be sliced is deposited onto the feed table 5 by the mechanism described in my copending application Serial No. 347,838, and is moved forwardly on the table 5 by the pusher head 4 to the reciprocating cutting blades 6 which completely slice the loaf. A shown in Fig. 8, the pusher head 4 is preferably formed with a plurality of spaced notches or slots so that the projections between the slots can extend beyond the blades 6 to force the sliced bread through the same onto a suitable delivery table or apron, or onto a conveyor employed in a wrapping machine.

The mechanism for reciprocating the pusher levers 2 is clearly described in the previously mentioned copending applications.

The feeding device comprises a conveyor mechanism which carries the bread to a point approximately over the feed table 5 of the slicing machine where the bread is discharged onto an elevator or lowering device which deposits the bread in the correct slicing position on the table 5 in front of the pusher head 4, so that it can be correctly fed to the reciprocating blades 6. The conveyor, lowering device and pusher head thus are synchronized to coact and progressively feed loaves of bread to the slicing blades.

Referring to Figs. 1 to 9, inclusive, the conveyor mechanism comprises a pair of spaced longitudinal side bars 7 secured at their forward ends to the side frames 1 by suitable brackets 8, the brackets being attached to the side frames 1 by suitable bolts 9. The side bars 7 are preferably held in spaced relationship by U-shaped connectors 10 which have their ends secured to the side bars 7 by suitable bolts 11. These connectors 10 have a number of flat supporting bars 12 secured thereto which support the upper side of the conveyor belt 13 and prevent the same from sagging.

The conveyor belt 13 which is of any suitable material, preferably operates over a pair of suitable rollers 14 and 15. The forward roller 14 is journaled in suitable brackets 16 secured to the foremost transversely extending connector 10 and the rearward roller 15 is preferably rotatably mounted on a transversely extending shaft 17. The ends of the shaft 17, as shown in Figs. 5 and 6, are preferably journaled in slidable brackets 18. These brackets 18 are supported by U-shaped members 19 secured to the rearward ends of the conveyor side rails or bars 7 and which are provided with L-shaped members 20 having suitable screws 21 threaded therethrough.

The screws 21 when tightened bear against the brackets 18 and force the shaft 17 rearwardly to correctly tension the conveyor belt 13. It is obvious that by turning the screws 21, the slack in the conveyor belt 13 can be taken up or compensated for by moving the roller 15 forwardly or rearwardly.

The conveyor belt 13 is provided with a plurality of regularly spaced transversely extending cleats 22 which positively engage the loaves of bread and prevent them from sliding on the belt, so that they can be discharged at regular intervals onto the table loading device, later to be described.

The belt 13 is so operated that upon each reciprocation of the pusher head 4 a loaf of bread is deposited upon the table loading device. This is accomplished by means of a ratchet arrangement which comprises a longitudinally movable pawl 23 that intermittently engages the cleats 22 of the conveyor belt 13.

A pair of U-shaped supports 24 are suitably secured to a pair of adjacent connecting members 10 near the central portion of the conveyor, and carry a pair of spaced longitudinally positioned guide bars 25 and 51. The pawl 23, which is triangularly shaped and extends rearwardly and upwardly, is secured to a suitable drive bar 26. The drive bar 26 is positioned between the guide bars 25 and seats upon the supports 24 which longitudinally guide the same. The guide bars 25 provide suitable means for holding the drive bar 26 against lateral displacement. A transversely extending cross member 27 is secured to the lower face of the drive bar 26 rearwardly of the pawl 23 to serve as a suitable stop which limits the rearward travel of the drive bar 26 by engaging the rear support 24, and which also limits the forward travel of the bar 26 by engaging the front support 24. The cross member 27 also seats against the lower faces of the guide bars 25 to hold the drive bar 26 against vertical displacement.

The forward end of the pawl 23 is preferably formed with transverse projections 28 which extend beyond the sides thereof and ride on the guide bars 25 to substantially prevent bending of the drive bar 26 intermediate its ends.

The forward ends of the guide bars 25 are preferably bent or inclined downwardly to guide and prevent the cleats 22 from catching the bars 25 in case slack occurs in the conveyor belt 13.

The rear ends of the guide bars 25 are bent downwardly and twisted substantially 90 degrees to provide spaced supports 29 for a short transversely extending shaft 30. The shaft 30 is rotatable and has a suitable pulley 31 secured thereto which supports a belt or actuating chain 32. One end of the chain 32 is secured to a hook portion 33 mounted on the pusher lever cross bar, and the other end thereof is secured to a hook portion 34 which is mounted on the stop bar 27 by means of a suitable bolt 35 or other suitable securing means. It is apparent that the forward motion of the pusher levers 2 pulls on the chain 32 to move the drive bar 26 rearwardly. The pawl 23 consequently engages the cleats 22 of the conveyor belt 13 to longitudinally move the same. As shown in the drawings, the cleats 22 are formed with angularly recessed portions 36 intermediate their ends to provide a suitable contacting portion for the pawl 23.

When the pusher levers 2 are retracted the drive bar 26 is moved forwardly by means of suitable springs 37 having one end attached to the bolt 35 and the other end attached to brackets 38 which are secured to the frame members 1.

In the operation of the conveyor, forward movement of the pusher moves the drive bar 26 rearwardly and the pawl 23, being in engagement with one of the cleats 22, consequently moves the belt 13 a distance equal to the length of travel of the drive bar 26 to discharge a loaf of bread onto the table loading mechanism. Upon rearward movement of the pusher, the springs 37 draw the drive bar 26 forwardly so that the pawl 23 slides underneath the next adjacent cleat 22 and engages the same in position to again actuate the conveyor belt 13. It is thus seen that the conveyor belt 13 is intermittently actuated by the pusher.

The loaves of bread carried by the conveyor belt are guided and centered by means of spaced guide members 40, the rear ends of which are preferably secured to the conveyor side bars 7 by bolts 41, and the intermediate portions of which are secured to the side bars 7 by bolts 42. The bolts 42 are preferably provided with spacers 43 which space the guide members 40 the desired distance from the side bars 7 and from each other.

The guide members 40 are preferably made of resilient material and the forward ends are curved inwardly and attached to adjustable supports 44 comprising horizontal and vertical portions. The horizontal portions of each support 44 are each formed with a slot 45 and are bolted to a stationary bracket 46 by bolts 47, the bracket 46 being secured to the outer face of the side frame 7. As shown in Figs. 1 and 5, the horizontal portion of the adjustable support 44 extends through a slot 48 formed in the side frame 7. The forward ends of the guide members 40 can thus be adjusted and correctly spaced, so that the bread being carried by the conveyor will be automatically centered thereon and discharged in the correct position onto the table loading device. The guide members 40 can also be adjusted to accommodate different lengths of bread.

In addition to serving as centering means for the bread, the guide members 40 also provide means for causing the bread to be discharged either on its bottom or on its side onto the elevator device. By adjusting the guide members 40 so that they merely contact with the bread as it moves between the same, the bread will be so discharged that its bottom engages the elevator devices. Furthermore, by adjusting the guide members 40 so that they have considerable friction with the ends of the bread, the bread will tilt and fall on its side onto the table loading devices. This, however, will later be described in connection with Figs. 13 and 14.

It is apparent that the conveyor is positioned somewhat above the feed table 5 of the slicing machine and that means must be provided for transferring the bread to the table in the desired position. This is accomplished in the present invention by means of elevator or lowering devices, which are slidably mounted upon a pair of spaced vertical bars 49 secured to each frame member 1 by upper and lower retainer blocks 50.

Although the table loading devices are clearly described in the application Serial No. 347,838, they will, however, for the sake of clearness and illustration, be briefly described herein.

The elevator or table loading devices, of which there are two, spaced from each other, are simultaneously reciprocable on the side rods 49 and are timed to operate with the conveyor just described and the pusher 4. It is to be understood, however, that any other suitable means may be employed, or that they may be eliminated and the conveyor so arranged to discharge the loaves of bread directly onto the feed table 5 of the bread slicing machine.

Briefly stated, each elevator device comprises a reciprocable carriage 51 slidably mounted on the side rods 49 and being actuated by a rod 52 which is moved in a vertical direction by a pivoted bar 53, the bar 53 being actuated by a cam 54 having engagement with an extending portion 55 of one of the pusher levers 2.

The carriage 51 supports a side plate 56 which has a bread support 57 pivoted thereto. The bread supports 57 are so arranged that when the carriages 51 are in their uppermost positions, they are held in a horizontal position to receive a loaf of bread from the conveyor and support the loaf at its ends, and that when the carriages approach their lowermost positions, they are tripped to swing downwardly onto the feed table 5 of the slicing machine.

From the drawings and the foregoing description of the present invention, it is apparent that the conveyor, table loading devices, and pusher are so arranged and so synchronized that loaves of bread can be continuously fed to the slicing blades and sliced.

The bread to be sliced is either manually or mechanically placed upon the upper half of the conveyor belt 13, and as the belt is intermittently moved forwardly by the pawl 23 the cleats 22 come in contact with the adjacent loaves of bread and carry them forwardly.

The loaf of bread, if it is placed too far to one side or the other of the belt 13, comes in contact with the nearest guide member 40 and is forced to a position centrally of the conveyor.

As the bread reaches the forward end of the conveyor it is carried forwardly and falls by gravity upon the elevator support plates 57. This occurs just prior to or as the pusher head 4 has moved a preceding loaf through the cutting blades 6.

At approximately the instant the pusher 4 reaches its rearmost position, the carriages 51 move downwardly to a point near the table 5, and the supports 57 are tripped and the loaf of bread is deposited onto the feed table 5 in the correct slicing position adjacent the cutting blades 6. As the pusher moves forward to feed the bread to the blades 6, the carriages move upwardly and the bread supports 57 are again moved to horizontal bread receiving position. As the pusher moves forwardly, the ratchet mechanism through the pawl 23 engages another cleat 22 and moves the conveyor belt 13 to discharge another loaf of bread onto the table loading devices, and the cycle of operation is then completed.

Figure 10:
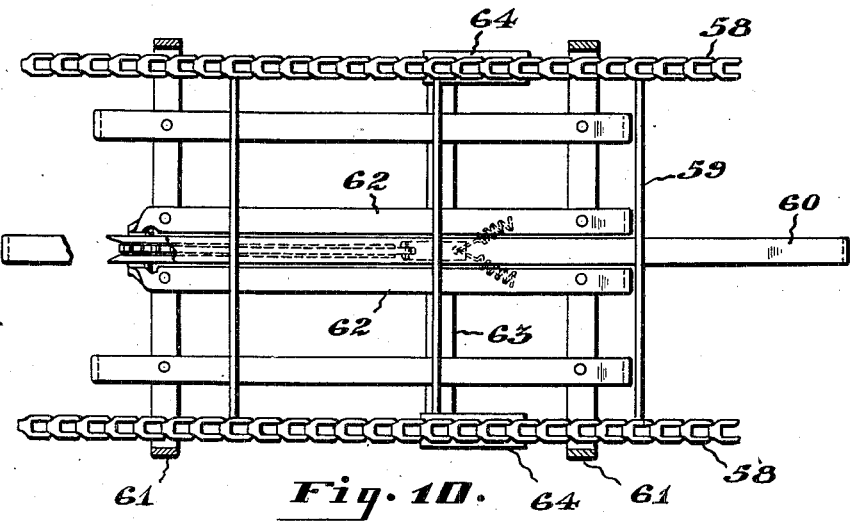
Fig. 10 is a partial plan view of a modified form of conveyor operating mechanism.
Figure 11:
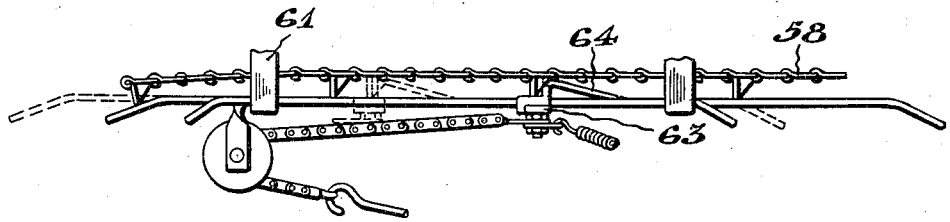
Fig. 11 is a side elevation of the mechanism shown in Fig. 10.
Figure 12:
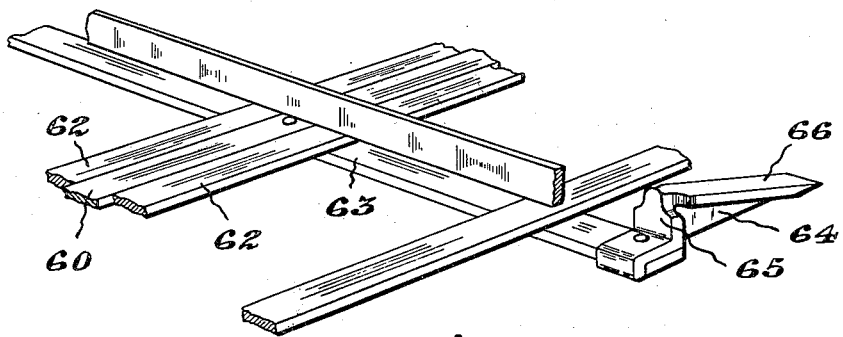
Fig. 12 is an enlarged perspective view of a portion of the mechanism shown in Fig. 10.

Referring to Figs. 10, 11 and 12 which relate to a modified form of conveyor and actuating mechanism and to the type shown in my copending application Serial No. 395,218 filed September 26, 1929, the conveyor belt comprises a pair of spaced chains 58 having cross bars 59 for engaging the bread, the upper side of the conveyor being movable over a smooth apron (not shown).

As previously described, a drive bar 60 is supported on the side rail connectors 61, and is guided between guide bars 62 secured to the connectors 61. In this construction the drive bar 60 has a cross bar 63 secured to the lower side thereof to engage the lower sides of the guide bars 62, which crossbar 63 is provided with pawls 64 secured to its outer ends. The pawls 64 are formed with vertical faces 65 which engage the conveyor cross cleats or slats 59 at their ends to give a more positive drive therefor. The pawls 64 are also formed with inclined faces 66 extending downwardly from the upper portions of the vertical faces 65 so that the conveyor cross cleats 59 can easily slide thereover.

The means for operating the drive bar 60 and returning the same is, however, the same as previously described.

Figure 13:
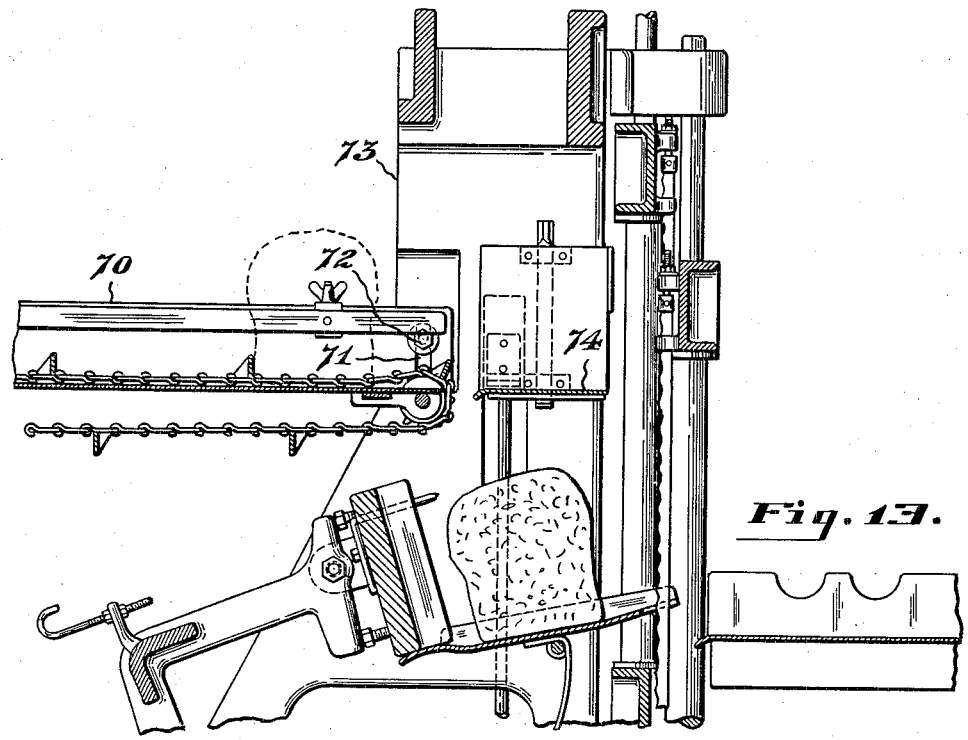
Fig. 13 is a partial longitudinal sectional view showing an adjustable mechanism for supporting the conveyor.
Figure 14:
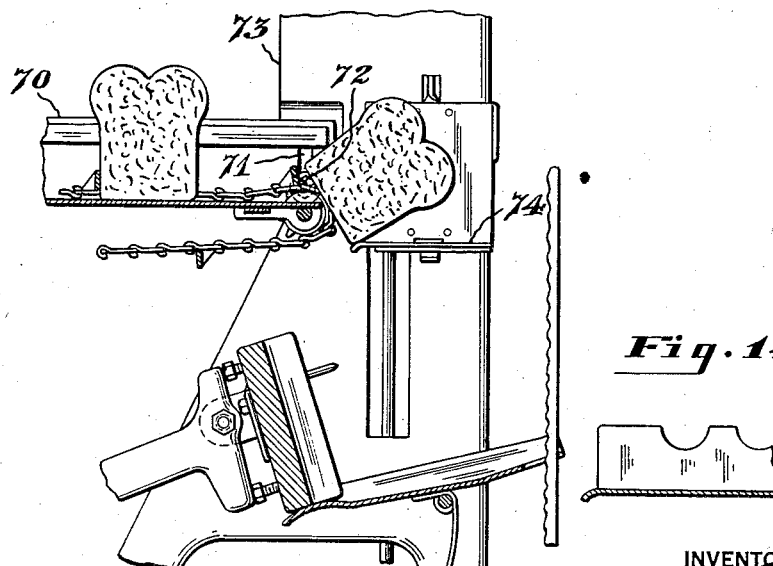
Fig. 14 is a view similar to Fig. 12 showing the conveyor in an adjusted position.

In Figs. 13 and 14 a modified means of adjustment is provided for the conveyor so that the bread being sliced can be presented either with its side face or top face to the cutting blades.

In this construction the forward ends of the conveyor side rails 70 are formed with vertical slots 71 through which bolts 72 extend to secure the same to the side frames 73 of the slicing machine. It can be seen in Fig. 13, with the conveyor in its lowest position, that the bed of the conveyor is substantially horizontal with bread supporting plates 74 of the table loading devices and the bread will be discharged on its bottom face onto the bread supporting plates 74.

It has been found that certain types or forms of loaves of bread, such as those having a creased top, will crush when being sliced because of the crease in the top of the loaf. In the present invention, this disadvantage is obviated by moving the conveyor upwardly to the position shown in Fig. 14 so that the bed of the conveyor is positioned somewhat above the bread supporting plates 74 of the table loading devices. With the conveyor in this position, it is obvious that the bread will tip as it leaves the conveyor and will drop onto the supporting plates 74 with its top presented toward the cutting blades. The advantages of such an arrangement are readily apparent.

It is to be noted that the present invention provides a conveying device for bread slicing machines which is adapted to continuously feed unsliced loaves to the machine and which is synchronized with the table loading device and feeder thereof.

It is obvious that in the present invention the bread is untouched from the time it is fed to the conveyor until it is completely sliced.

Furthermore, it is to be understood that the particular form of bread slicing machine shown and described and the particular method set forth, are presented for purposes of explanation and illustration and that various modifications may be made from said invention without departing from the spirit and scope of my invention.

What I claim is:

1. In a bread slicing machine, a feeding conveyor comprising an endless intermittently movable member, a plurality of transverse bread engaging cleats on said member, a longitudinally reciprocable drive bar positioned below the lower side of said member, means on said drive bar for progressively engaging said cleats to intermittently move said endless member, and means for reciprocating said drive bar.

2. In a bread slicing machine having a reciprocable pusher, a conveyor for progressively feeding loaves of bread to said machine comprising an endless intermittently movable apron, a plurality of regularly spaced transverse cleats secured to said apron, a longitudinally reciprocable drive bar, a pawl on said drive bar adapted to progressively engage said cleats, means actuated by said pusher for moving said drive bear rearwardly to thereby move said apron, and means for moving said drive bar forwardly whereby said pawl may engage the next adjacent cleat.

3. In a bread slicing machine having a reciprocable pusher for feeding loaves of bread to be sliced, an endless conveyor for progressively feeding loaves of bread to said machine, bread engaging cleats carried by said conveyor, a longitudinally reciprocable drive bar, a pawl on said drive bar adapted to progressively engage said cleats, means connecting said pusher with said drive bar for moving said drive bar rearwardly during forward movement of said pusher to actuate said conveyor, and means for returning said drive bar to a forward position during rearward movement of said pusher.

4. In a bread slicing machine having a reciprocable pusher for feeding loaves of bread to be sliced, an endless conveyor for progressively feeding loaves of bread to said machine, bread engaging cleats carried by said conveyor, a longitudinally reciprocable drive bar, a pawl on said drive bar adapted to progressively engage said cleats to intermittently actuate said conveyor, a roller member, and a flexible member connected with said drive bar passing over said roller member and connected with said pusher, whereby forward feeding movement of said pusher through said flexible member moves said drive bar rearwardly to actuate said conveyor.

5. In a bread slicing machine having a reciprocable pusher for feeding loaves to be sliced, a conveyor mechanism for progressively delivering loaves of bread to said pusher, said conveyor mechanism comprising an endless apron, bread engaging cleats secured to said apron, a longitudinally reciprocable drive bar, means on said bar engageable with a said cleat to move said conveyor a predetermined distance, a roller member, a flexible member connected with said drive bar, passing over said roller and connected with said pusher, whereby forward feeding movement of said pusher moves said drive bar rearwardly to actuate said conveyor, and spring means for returning said drive bar to a forward position during rearward movement of said pusher.

6. In a bread slicing machine having a reciprocable pusher for feeding loaves of bread to be sliced, a mechanism for progressively delivering loaves of bread to said pusher, said mechanism comprising an endless conveyor having transverse loaf engaging members thereon, a longitudinally reciprocable drive member, a bar secured to and extending transversely of said drive member, pawls on the ends of said bar for intermittently engaging and moving said conveyor a predetermined distance, means connecting said drive member and said pusher whereby movement of said pusher will cause said drive member to move said conveyor, and means for returning said drive member after movement thereof by said pusher.

In testimony whereof I affix my signature.

OTTO F. ROHWEDDER.